July 29, 1947.  S. JUHASZ  2,424,932
FILTER COMPRISING A SEDIMENT TRAP AND DRAIN OUTLET
Filed Aug. 31, 1945
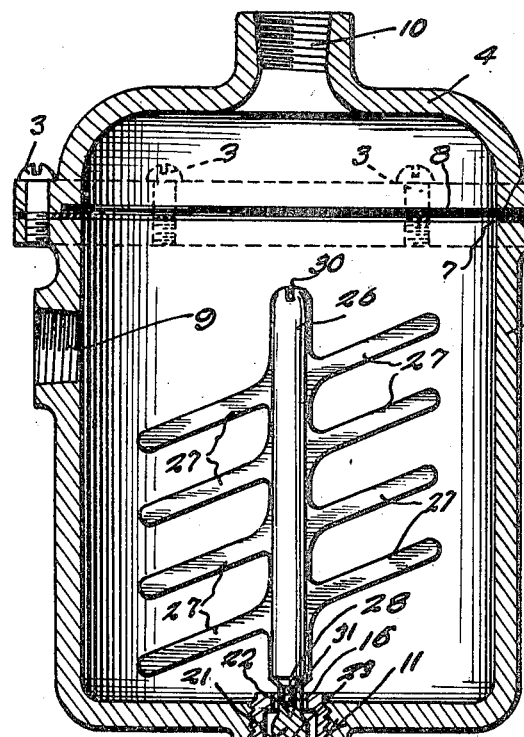
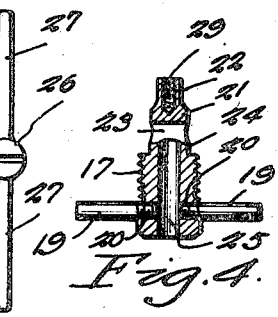
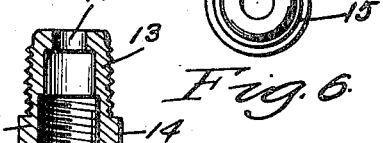
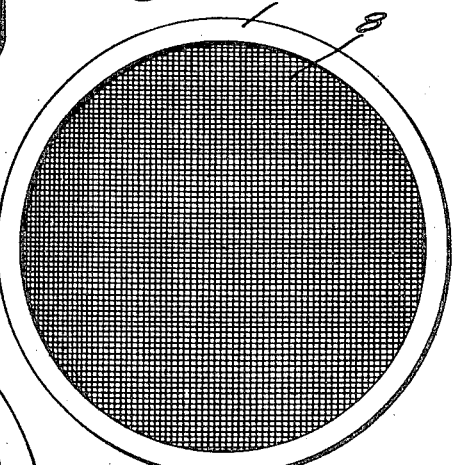
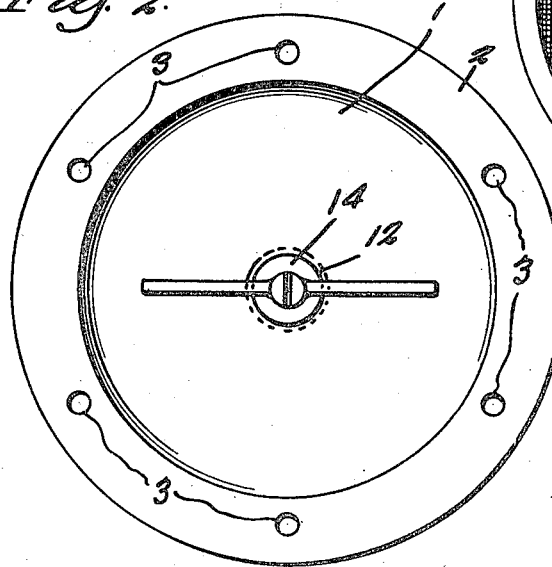
Inventor
STEPHEN JUHASZ Patented July 29, 1947

2,424,932

UNITED STATES PATENT OFFICE 2,424,932

FILTER COMPRISING A SEDIMENT TRAP AND DRAIN OUTLET

Stephen Juhasz, Denver, Colo., assignor of fifty-one per cent to Oscar Menachof

Application August 31, 1945, Serial No. 613,905

7 Claims. (Cl. 210—165)

1

This invention relates to a filter which is particularly adapted for use in the fuel line of a motor so that gasoline flowing from a fuel tank to a carburetor will be freed from sediment and other impurities which may have entered the fuel line. At the present time, the fuel lines of all internal combustion engines are equipped with filters in order to prevent sediment from reaching the carburetor and causing the carburetor to be clogged, but they have not been found satisfactory, as the sediment which gathers in the filter cannot be readily removed without taking the filter apart for cleaning it. Therefore, one object of the invention is to provide a filter which may be mounted in the fuel line of an internal combustion engine and is constructed that, by opening a drain in the bottom of the filter, sediment may be allowed to pass through a drain and thus removed from the filter without it being necessary to disconnect the filter from the fuel line and take it apart for cleaning.

Another object of the invention is to provide a filter wherein the outlet or drain at the bottom thereof is controlled by a valve carrying, at its inner end, an agitator which is disposed within the filter and will be rotated when the valve of the drain is turned. It will thus be seen that by rotating the valve between opened and closed positions, the agitator may be turned and sediment which has accumulated in the lower portion of the casing of the filter stirred and thus mixed with gasoline in the lower portion of the filter casing to such an extent that by leaving the valve in its opened position, the sediment will flow through the outlet.

Another object of the invention is to provide a filter having the agitator detachably connected with the valve and thus allow easy removal of the agitator and the valve when thorough cleaning is necessary and also allow the agitator and the valve to be very easily assembled.

Another object of the invention is to provide a filter consisting of a few number of parts which are very simple in construction and is of such construction that sediment may be drained from the filter without use of tools.

The invention is illustrated in the accompanying drawings, wherein:

Figure 1 is a sectional view taken vertically through the improved filter.

Figure 2 is a bottom plan view of the filter.

Figure 3 is a view of a screen mounted in the filter between the upper end of its casing and the head or cap for the casing.

Figure 4 is a sectional view taken longitudinally

2 through the valve for controlling flow of gasoline and sediment through the drain of the filter.

Figure 5 is a sectional view taken longitudinally through the sleeve in which the valve of Figure 4 is mounted.

Figure 6 is a view looking at the inner end of the sleeve shown in Figure 5.

Figure 7 is a view looking down upon the agitator carried by the valve and disposed within the casing of the filter.

This improved filter has a casing or gasoline receptacle 1 which is of cup-shape formation and provided about its open, upper end with an outstanding circumferentially extending flange 2 formed with threaded opening to receive screws 3 by means of which the cap or head 4 is removably secured to the receptacle 1. A recess 5 is formed in the lower edge face of the cap 2 about the inner periphery of its flange 6 to receive the rim 7 of a screen 8, and when the screws 3 are tightened, the rim 7 will be firmly gripped between the cap and the upper edge face of the receptacle 1 and the screen firmly held in place so that gasoline which enters the receptacle through the inlet 9 and flows upwardly to reach the outlet 10 must pass through the screen and thus cause sediment and other impurities in the gasoline to be confined within the receptacle and prevented from reaching the outlet.

At its bottom, the receptacle 1 is formed with a centrally located threaded opening 11 surrounded by a depending collar or neck 12 and into this threaded opening is screwed an externally threaded sleeve 13 which has its outer end portion enlarged to form a head 14 for engagement by a wrench in order that the sleeve may be screwed tightly in place and a gasket 15 compressed between the head 14 and the lower end of the neck 12 to form a sealed joint between the sleeve and the neck. An opening 16 is formed centrally of the inner end of the sleeve and constitutes a passage through which gasoline and sediment may flow when the filter is to be drained.

A plug 17 which is externally threaded is screwed into the sleeve 13 with its threads in engagement with the internally threaded outer or lower end portion 18 of the sleeve and rods 19 which extend diametrically of the plug are screwed into threaded openings 20 formed radially of the lower end portion of the plug so that by grasping these rods, the plug may be easily turned for inward or outward movement through the sleeve. A valve head 21 is formed at the inner end of the plug 20 and from this valve head extends a neck 22 which passes through the opening 16 and is of such diameter that an annular space will be provided between the neck 22 and walls of the opening 16 to allow gasoline and sediment to flow through the opening 16 when the plug is turned to move the valve head 21 to the position of Figure 1, where it is out of blocking relation to the opening 16. When the plug is screwed downwardly to move the valve head 21 to its lowered or opened position, gasoline and sediment may flow through the opening 16 into the sleeve 13 and then flow through an opening 23 formed diametrically of the reduced inner end portion 24 of the plug and outwardly through the passage 25 extending longitudinally of the plug from the passage 23 to the lower end of the plug.

When sediment is to be drained from the receptacle 1 of the filter, it is desired to agitate gasoline in the filter so that sediment which has accumulated at the bottom of the receptacle will be stirred up and mixed with the gasoline to such an extent that it will flow outwardly through the sleeve 13 and the passages of the plug with the gasoline. In order to do so, there has been provided an agitator formed with a post 26 carrying arms which project radially from the post. These arms are disposed at diametrically opposite sides of the post and extend at an incline, as shown in Figure 1, so that when the post is turned, the arms will very effectively impart swirling motion to gasoline in the receptacle or container 1 and cause sediment which has accumulated at the bottom of the receptacle to be intermingled with the gasoline in the receptacle. A stem 28 having left-hand threads extends downwardly from the lower end of the post 26 for engagement in the similarly threaded socket 29 leaving from the upper end of the neck 22 of the plug, and across its upper end the post is formed with a groove 30 in order that the blade of a screwdriver may be engaged in this groove and the post turned to screw the stem 28 tightly into the socket 29. Therefore, the post will be connected with the inner or upper end of the plug and when the plug is turned, the post will be turned with it and the arms or rods 27 moved in a circular path to agitate the gasoline in the receptacle and thus cause the sediment at the bottom of the receptacle to be thoroughly stirred up and intermingled with the gasoline. The lower end of the post is rounded to form a valve portion 31 which is spaced upwardly from the inner end of the sleeve 13 when the plug is in the position of Figure 1 or screwed upwardly to close the lower end of the opening 16. By turning the plug downwardly a sufficient distance, the valve portion 31 of the plug will be moved into position to engage the inner end of the sleeve 13 and close opening 16. Since the distance between the valve head 21 and the valve portion 31 is greater than the thickness of the inner end of the sleeve through which opening 16 is formed, the valve head 21 and the valve portion 31 may both be disposed out of blocking relation to the opening 16 and gasoline and sediment may then flow through the opening 16 into the sleeve and out through the passages 23 and 25. By turning the plug to move it either upwardly or downwardly, a valve member may be moved into blocking relation to the opening 16 and the drain will be closed and gasoline confined in the receptacle. When the gasoline is to be drained and sediment stirred prior to such drainage, the plug may be turned first in one direction and then in an opposite direction a number of times necessary to thoroughly agitate the gasoline and stir up the sediment and the turning of the plug stopped with the valve head 21 and the valve portion 31 both out of blocking relation to the opening 16. After the gasoline and sediment has all drained from the receptacle, the plug may be turned in either direction to close the opening 16 and the receptacle again filled with clean gasoline. It will thus be seen that by use of a filter of the improved construction, sediment will be prevented from reaching the carburetor of an internal combustion engine and, when necessary, gasoline and sediment may be very easily drained from the filter without use of special tools and without taking the filter apart.

It is thought that persons skilled in the art to which the invention relates will be able to obtain a clear understanding of the invention after considering the description in connection with the drawings. Therefore, a more lengthy description is regarded as unnecessary.

What is claimed is:

1. A filter comprising a receptacle having an inlet opening in its side wall near its top, a cover for said receptacle having an outlet opening in its upper end, a screen between the cover and the upper end of said receptacle, said receptacle having a threaded drain opening formed through its bottom and a depending neck surrounding the threaded drain opening, a sleeve screwed into the threaded drain opening and formed with a turning head at its lower end, a gasket between the neck and the turning head and forming a sealed joint, said sleeve having an opening through its inner end, a plug screwed into said sleeve and having a reduced inner end portion forming a valve member for blocking the lower end of the opening through the inner end of the sleeve, and a neck extending upwardly from the valve member and passing through the opening of the sleeve, said plug being formed with a longitudinally extending discharge passage leading from its lower end and communicating with a transversely extending passage formed through the lower portion of the valve member, said neck being formed with a threaded socket leading from its upper end, and an agitator in said receptacle including a vertically disposed post having a threaded stem at its lower end screwed into the socket leading from the upper end of the neck of said plug, said post having its lower end portion about its stem rounded to form a valve member for blocking the upper end of the opening through the inner end of the sleeve, the neck of the plug being of a length greater than the opening through the inner end of the sleeve whereby both valve members may be disposed out of blocking relation to the opening in the sleeve, and arms extending radially from said post at an incline for agitating gasoline in the receptacle and stirring up sediment at the bottom of the receptacle when the plug and the post are turned.

2. A filter comprising a receptacle having an inlet and an outlet near its upper end and a screen between the inlet and the outlet, said receptacle having a drain opening through its bottom, a sleeve removably mounted through said drain opening and at its inner end being formed with a drain passage, a plug screwed into said sleeve through the lower end thereof and having its upper end portion reduced in diameter and formed with a valve member for closing the lower end of the drain passage and a neck passing upwardly through the drain passage and of greater length than the drain passage, said plug being formed with a transversely extending passage through the lower portion of its valve member and with a longitudinally extending discharge passage leading from its lower end and communicating with the transverse passage, and an agitator in said receptacle including a post having a stem at its lower end screwed into a socket formed in the upper end of the neck of the plug, said post being formed about its stem with a rounded portion constituting a valve member for closing the upper end of the drain passage at the inner end of the sleeve.

3. A filter comprising a receptacle having an inlet and an outlet near its upper end and a screen between the inlet and the outlet, the bottom of said receptacle being formed with a drain opening, a sleeve removably mounted through the drain opening at the bottom of said receptacle and formed with a drain passage at its inner end, a plug rotatable in said sleeve and movable longitudinally in the sleeve, said plug having its inner end portion formed with a valve member for closing the lower end of the drain passage when the plug is moved upwardly through the sleeve, and a neck extending upwardly from its valve member through the drain passage and of greater length than the drain passage, said plug being formed with a discharge passage communicating with the interior of the sleeve about the valve member thereof, and an agitator in said receptacle including a post removably connected with the upper end of said neck and formed with a valve portion for closing the upper end of the drain passage when the plug is moved downwardly a predetermined distance.

4. A filter comprising a receptacle having an inlet and an outlet near its upper end and a filter screen therebetween, a drain opening being formed through the bottom of said receptacle, a sleeve mounted through the drain opening of the receptacle and at its upper end being formed with a drain passage, a plug screwed into said sleeve and having its upper end portion formed with a valve member for closing the lower end of the drain passage when the plug is in predetermined position in the sleeve and a neck passing through the outlet opening and of greater length than the outlet opening, said plug being formed with a discharge passage for flow of liquid out of said sleeve when the valve of the sleeve is in an open position, and an agitator in the receptacle carried by the inner end of the neck of said plug and formed with a valve portion for closing the upper end of the drain passage when the plug is screwed downwardly to a predetermined position.

5. A filter comprising a receptacle having an inlet and an outlet near its upper end and a filter screen between the inlet and outlet, said receptacle also having a discharge opening in its bottom, an agitator in said receptacle, a member shiftable vertically and formed with a discharge passage, said member including a valve member for closing the lower end of the drain opening, and a neck passing through the drain opening and carrying said agitator, said agitator having a portion constituting a valve member for closing the upper end of the outlet.

6. A filter comprising a receptacle having an outlet and an inlet near its upper end and a filter therebetween, said receptacle having a drain opening in its bottom, a vertically shiftable and rotatable member in the drain opening, said member being formed with a discharge passage for the discharge of liquid flowing through the drain opening and being provided with a valve member for closing the lower end of the drain opening, and an agitator in said receptacle carried by the upper end of the vertically shiftable member and rotatable therewith, and having a portion constituting a valve member for closing the upper end of the drain opening.

7. A filter comprising a receptacle having a fuel inlet and a fuel outlet near its upper end with a filter therebetween and at its bottom being provided with a drain opening, a valve for closing the drain opening shiftable upwardly into closing relation to the lower end of the drain opening and downwardly out of closing relation to the drain opening, and an agitator in said receptacle carried by and moving with said valve member and provided with a valve member for closing the upper end of the drain opening.

STEPHEN JUHASZ.

REFERENCES CITED

The following references are of record in the file of this patent:

UNITED STATES PATENTS

| Number | Name | Date |
|---|---|---|
| 2,188,643 | Laderer | Jan. 30, 1940 |
| 1,265,734 | Brunker | May 14, 1918 |
| 1,762,593 | Schwarz | June 10, 1930 |
| 802,922 | Evans | Oct. 24, 1905 |
| 1,766,684 | Pierce | June 24, 1930 |
| 657,553 | Loder | Sept. 11, 1900 |

FOREIGN PATENTS

| Number | Country | Date |
|---|---|---|
| 310,110 | Great Britain | Apr. 25, 1929 |